US011002484B2

(12) United States Patent
Hu

(10) Patent No.: US 11,002,484 B2
(45) Date of Patent: May 11, 2021

(54) HEATING APPARATUS FOR VERTICALLY AND HELICALLY CONVEYING WORKPIECE

(71) Applicant: XI'AN AOJIE ELECTRIC HEATING EQUIPMENT ENGINEERING CO., LTD, Xian (CN)

(72) Inventor: Jie Hu, Xian (CN)

(73) Assignee: XI 'AN AOJIE ELECTRIC HEATING EQUIPMENT ENGINEERING CO., LTD, Xian (CN)

( * ) Notice: Subject to any disclaimer, the term of this patent is extended or adjusted under 35 U.S.C. 154(b) by 344 days.

(21) Appl. No.: 15/774,276

(22) PCT Filed: Apr. 20, 2016

(86) PCT No.: PCT/CN2016/079713
§ 371 (c)(1),
(2) Date: May 7, 2018

(87) PCT Pub. No.: WO2017/075944
PCT Pub. Date: May 11, 2017

(65) Prior Publication Data
US 2018/0347906 A1 Dec. 6, 2018

(30) Foreign Application Priority Data

Nov. 7, 2015 (CN) ......................... 201510751078.1
Nov. 7, 2015 (CN) ......................... 201510751080.9
Dec. 13, 2015 (CN) ......................... 201521037618.1

(51) Int. Cl.
*F27D 15/02* (2006.01)
*F27B 19/04* (2006.01)
(Continued)

(52) U.S. Cl.
CPC ............ *F27D 15/0286* (2013.01); *F27B 7/18* (2013.01); *F27B 9/025* (2013.01); *F27B 9/029* (2013.01);
(Continued)

(58) Field of Classification Search
CPC .. F27B 7/18; F27B 9/025; F27B 9/029; F27B 15/02; F27B 19/02; F27B 19/04;
(Continued)

(56) References Cited

U.S. PATENT DOCUMENTS 3,348,659 A * 10/1967 Roinestad .............. B65G 21/18 198/778
4,679,687 A * 7/1987 Rehm .................... B65G 15/02 198/690.2
(Continued)

FOREIGN PATENT DOCUMENTS

CN 2890808 4/2007
CN 105241246 1/2016
(Continued)

*Primary Examiner* — Steven B McAllister
*Assistant Examiner* — Benjamin W Johnson
(74) *Attorney, Agent, or Firm* — Lex IP Meister, PLLC

(57) ABSTRACT

A conveyer system for vertically and helically conveying a workpiece includes a main bracket, on which interconnected heating furnace and cooling furnace are arranged in parallel. The heating furnace includes a $1^{st}$ spiral supporting plate, a conveyer belt arranged on the $1^{st}$ spiral supporting plate along the spiral direction and one or multiple gas inlet/inlets to fill protective gas into the heating furnace. The cooling furnace includes a $2^{nd}$ spiral supporting plate, the conveyer belt extended from the heating furnace arranged on the $2^{nd}$ spiral supporting plate along the spiral direction and one or multiple gas inlet/inlets to fill protective gas into the cooling furnace. A drive mechanism for a conveyer belt is installed on the main bracket. The conveyer belt runs through the
(Continued)

heating furnace and cooling furnace and forms one loop via the drive mechanism.

7 Claims, 1 Drawing Sheet

(51) Int. Cl.

| | |
|---|---|
| ***F27D 3/00*** | (2006.01) |
| ***F27B 15/02*** | (2006.01) |
| ***F27B 9/02*** | (2006.01) |
| ***F27B 7/18*** | (2006.01) |
| ***F27B 19/02*** | (2006.01) |
| ***F27D 7/06*** | (2006.01) |
| *F27B 7/16* | (2006.01) |

(52) U.S. Cl.
CPC .............. *F27B 15/02* (2013.01); *F27B 19/02* (2013.01); *F27B 19/04* (2013.01); *F27D 3/00* (2013.01); *F27D 7/06* (2013.01); *F27B 2007/165* (2013.01); *F27D 2015/0293* (2013.01)

(58) Field of Classification Search
CPC ........ F27B 2007/165; F27D 3/00; F27D 7/06; F27D 15/0286; F27D 2015/0293
USPC ............................................................ 432/77
See application file for complete search history.

(56) References Cited

U.S. PATENT DOCUMENTS

| | | | | |
|---|---|---|---|---|
| 4,944,162 A * | 7/1990 | Lang | B65G 17/062 | 198/831 |
| 5,398,521 A * | 3/1995 | Baron | B65G 21/18 | 62/381 |
| 2015/0291360 A1* | 10/2015 | Balk | B65G 15/24 | 198/602 |

FOREIGN PATENT DOCUMENTS

| | | |
|---|---|---|
| CN | 105241247 | 1/2016 |
| CN | 105258508 | 1/2016 |
| CN | 105352316 | 2/2016 |
| CN | 205138187 | 4/2016 |
| CN | 205138201 | 4/2016 |
| CN | 205138202 | 4/2016 |
| CN | 205138203 | 4/2016 |
| CN | 2842340 | 11/2016 |
| JP | 2005120394 | 5/2005 |

* cited by examiner

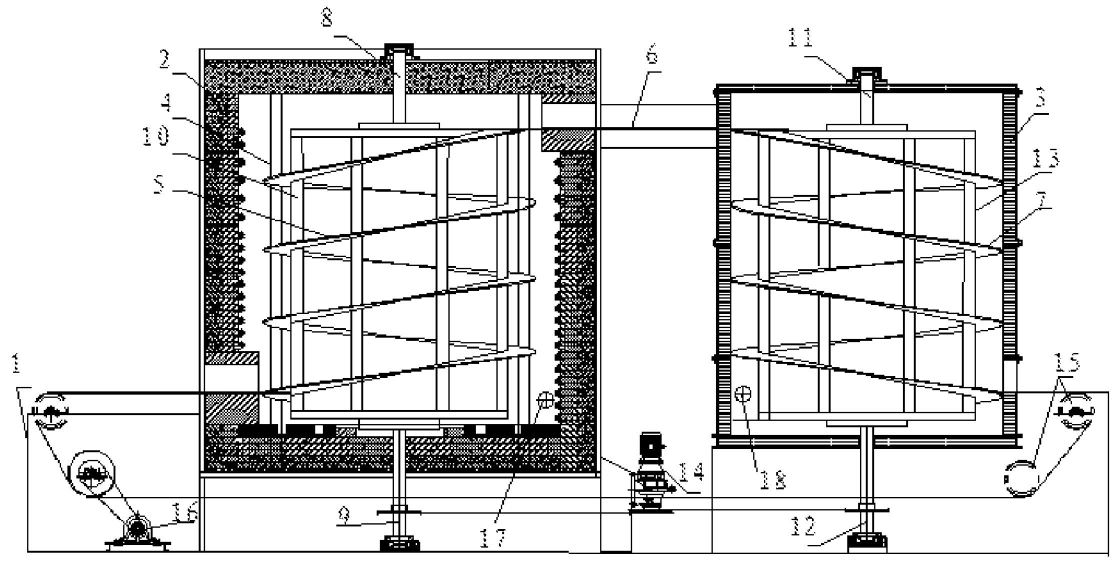
8
11
6
2
4
10
5
3
13
7
1
15
14
18
16
9
17
12

HEATING APPARATUS FOR VERTICALLY AND HELICALLY CONVEYING WORKPIECE

TECHNICAL FIELD

The invention belongs to the technical field of mechanical manufacture, of which a heating apparatus for vertically and helically conveying a workpiece is particularly involved.

BACKGROUND TECHNOLOGY

In the mechanical processing field, heat treatment process of cooling after heating for workpiece drying, brazing stress relief annealing, artificial aging etc. shall be carried out. In the present technology, a horizontal type heating cooling device is usually used to heat and cool the workpiece. With transversal arrangement and large area occupation of the conveyer belt, the energy is lost during continuous heating and cooling. In addition, the productivity of the enterprise is affected in case of limited space.

INVENTION CONTENT

The technical problem to be solved by the invention is the technology deficiency mentioned above. The present invention provides one type of highly effective and energy-saving conveyer system for the heating furnace and cooling furnace provided in a small equipment floor area.

In order to solve the above technical problem, the present invention provides a conveyer system including a main bracket, on which interconnected heating furnace and cooling furnace are arranged in parallel;

A bracket is placed inside the mentioned heating furnace, a 1$^{st}$ spiral supporting plate is spiraling on the bracket, and a conveyer belt is arranged on the 1$^{st}$ spiral supporting plate along spiral direction. One or multiple gas inlet/inlets are set on the heating furnace body to fill protective gas into the heating furnace;

A 2$^{nd}$ spiral supporting plate is spiraling vertically inside the mentioned cooling furnace. The direction of the mentioned conveyer belt inside the cooling furnace is uniform to that of the 2$^{nd}$ spiral supporting plate. A drive mechanism for the conveyer belt is installed on the mentioned main bracket. One or multiple gas inlet/inlets are set on the cooling furnace body to fill protective gas into the cooling furnace;

The conveyer belt runs through the mentioned heating furnace and cooling furnace and forms one loop via drive mechanism.

Further, the 2$^{nd}$ spiral supporting plate is welded on the inner wall of cooling furnace;

In addition, a 1$^{st}$ rotation unit is vertically placed inside the heating furnace, which comprises a 1$^{st}$ upper rotating shaft and a 1$^{st}$ lower rotating shaft, between which several vertical 1$^{st}$ supporting bars are connected. The mentioned 1$^{st}$ supporting bar is closely against the inner side of the conveyer belt. The 1$^{st}$ upper rotating shaft goes through top plate of the heating furnace and installed to the top plate via a bearing. And the 1$^{st}$ lower rotating shaft goes through bottom plate of heating furnace and installed on the main bracket via bearing.

Furthermore, a 2$^{nd}$ rotation unit is vertically placed inside the mentioned cooling furnace, which comprises a 2$^{nd}$ upper rotating shaft and a 2$^{nd}$ lower rotating shaft, between which several vertical 2$^{nd}$ supporting bars are connected. The mentioned 2$^{nd}$ supporting bar is closely against the inner side of the 2$^{nd}$ conveyer belt. The 2$^{nd}$ upper rotating shaft goes through top plate of the cooling furnace and installed to the top plate via a bearing. And the 2$^{nd}$ lower rotating shaft goes through bottom plate of the cooling furnace and installed on the main bracket via bearing.

The mentioned main bracket is equipped with a 1$^{st}$ motor for driving the 1$^{st}$ and the 2$^{nd}$ rotation units.

Furthermore, the mentioned drive mechanism comprises many guiding rollers for guiding the conveyer belt and a 2$^{nd}$ motor for driving the guiding rollers and putting the conveyer belt in motion.

The protective gas is one of the following gases: Hydrogen, Nitrogen, Ammonia decomposition gas ($3H_2+N_2$), DX gas, methyl alcohol & Nitrogen, Nitrogen & Hydrogen.

The present invention is one type of vertical and helical conveyer with the following advantages: 1. High effective energy-saving device occupying small floor area; 2. Productivity can be highly improved with same floor area and energy consumption; 3. Continuous production.

ATTACHED DRAWING DESCRIPTION

FIG. 1 is a cross-sectional view of an exemplary embodiment of a vertical and helical conveyer.

In which: 1. Main bracket 2. Heating furnace 3. Cooling furnace 4. Bracket 5. 1$^{st}$ spiral supporting plate 6. Conveyer belt 7. 2$^{nd}$ spiral supporting plate 8. 1$^{st}$ upper rotating shaft 9. 1$^{st}$ lower rotating shaft 10. 1$^{st}$ supporting bar 11. 2$^{nd}$ upper rotating shaft 12. 2$^{nd}$ lower rotating shaft 13. 2$^{nd}$ supporting bar 14. 1$^{st}$ motor; 15. Guiding roller 16. 2$^{nd}$ motor 17. Gas inlet of heating furnace 18. Gas inlet of cooling furnace

DETAILED MODE OF EXECUTION

The invention is heating apparatus for vertically and helically a conveying workpiece, as FIG. 1 shown, comprising main bracket (1), on which an interconnecting heating furnace (2) and a cooling furnace (3) are placed in parallel. The bracket (4) is placed inside the heating furnace (2), the 1$^{st}$ spiral supporting plate (5) is spiraling on the bracket (4), and a conveyer belt (6) is arranged on the 1$^{st}$ spiral supporting plate (5) along spiral direction; one or multiple gas inlet/inlets (17) are set on the heating furnace (2) to fill a protective gas into the heating furnace (2); The 2$^{nd}$ spiral supporting plate (7) is spiraling vertically inside the mentioned cooling furnace (3); the direction of the mentioned conveyer belt (6) inside the cooling furnace (3) is uniform to that of the 2$^{nd}$ spiral supporting plate (7); a drive mechanism for a conveyer belt is installed on the mentioned main bracket (1). One or multiple gas inlet/inlets (18) are set on the cooling furnace (3) to fill protective gas into the cooling furnace (3); the conveyer belt (6) runs through the mentioned heating furnace (2) and cooling furnace (3) and forms one loop via a drive mechanism. The protective gas is used for protecting the workpiece inside the heating furnace (2) and cooling furnace (3). The protective gas is one of the following gases: Hydrogen, Nitrogen, Ammonia decomposition gas ($3H_2+N_2$), DX gas, methyl alcohol & Nitrogen, and Nitrogen & Hydrogen. During practical production, the gas selection is subject to process requirement. The invention is heating apparatus for vertically and helically conveying a workpiece, which is used for a normal heating, a brazing heating or other heat treatment under a protective atmosphere.

The invention is heating apparatus for vertically and helically conveying a workpiece, the 2$^{nd}$ spiral supporting plate (7) is welded on the inner wall of the cooling furnace (3). The 1$^{st}$ rotation unit is vertically placed inside the heating furnace (2), which comprises the 1$^{st}$ upper rotating shaft (8) and the 1$^{st}$ lower rotating shaft (9), between which several vertical 1$^{st}$ supporting bars (10) are connected. The mentioned 1st supporting bar (10) is closely against the inner side of the 1$^{st}$ conveyer belt. The 1$^{st}$ upper rotating shaft goes through the top plate of the heating furnace (2) and installed outside the top plate via a bearing. And the 1st lower rotating shaft goes through the bottom plate of the heating furnace (2) and installed on the main bracket (1) via a bearing. The 2$^{nd}$ rotation unit is vertically placed inside the mentioned cooling furnace, which comprises the 2$^{nd}$ upper rotating shaft (11) and the 2$^{nd}$ lower rotating shaft (12), between which several vertical 2$^{nd}$ supporting bars (13) are connected. The mentioned 2$^{nd}$ supporting bar (13) is closely against the inner side of the 2$^{nd}$ conveyer belt. The 2$^{nd}$ upper rotating shaft (11) goes through the top plate of cooling furnace (3) and installed to the top plate via a bearing. And the 2$^{nd}$ lower rotating shaft (12) goes through bottom plate of the cooling furnace (3) and installed on the main bracket (1) via a bearing. The main bracket (1) is equipped with the 1$^{st}$ motor (14) for driving the 1$^{st}$ and the 2$^{nd}$ rotation units. The drive mechanism comprises many guiding rollers for guiding the conveyer belt and the 2$^{nd}$ motor (16) for driving the guiding rollers and putting the conveyer belt in motion.

The invention is heating apparatus for vertically and helically conveying a workpiece. The 1$^{st}$ spiral supporting plate (5) is placed inside heating furnace (2) for supporting and conveying conveyer belt (6). A longer conveying belt can be set in the same space inside the heating furnace to ensure conveying more workpiece and improve productivity. A heating device is set on inner wall of the heating furnace. The heating furnace volume with the conveyer belt in same length is smaller, and since the heating space is reduced, energy is thereby saved and heat efficiency improved. The 2$^{nd}$ spiral supporting plate (7) is set in the cooling furnace (3) to save energy. During rotation of the 1$^{st}$ supporting bar (10) and the 2$^{nd}$ supporting bar (13), friction power is provided to the conveyer belt (6) to reduce wearing of the conveyer belt and to prolong service life.

The invention claimed is:

1. A vertical and helical conveyer system for conveying a work piece, comprising:

- a heating furnace having a first opening and a second opening;
- a first spiral supporting plate installed in the heating furnace;
- a plurality of first supporting bars vertically disposed inside of the first spiral supporting plate and connected to the first spiral supporting plate;
- a first upper rotating shaft connected to top ends of the first supporting bars and penetrating a top plate of the heating furnace, the first upper rotating shaft installed to the top plate of the heating furnace via a bearing, wherein a part of the first upper rotating shaft is disposed outside of the top plate of the heating furnace;
- a first lower rotating shaft connected to bottom ends of the first supporting bars and penetrating a bottom plate of the heating furnace, the first lower rotating shaft installed on a base via a bearing;
- a cooling furnace having a third opening and a fourth opening;
- a second spiral supporting plate installed in the cooling furnace;
- a plurality of second supporting bars vertically disposed inside of the second spiral supporting plate and connected to the second spiral supporting plate;
- a second upper rotating shaft connected to top ends of the second supporting bars and penetrating a top plate of the cooling furnace, the second upper rotating shaft installed to the top plate of the cooling furnace via a bearing, wherein a part of the second upper rotating shaft is disposed outside of the top plate of the cooling furnace;
- a second lower rotating shaft connected to bottom ends of the second supporting bars and penetrating a bottom plate of the cooling furnace, the second lower rotating shaft installed on the base via a bearing;
- a conveyer belt running into the heating furnace through the first opening, arranged on the first spiral supporting plate, running out of the heating furnace through the second opening, running into the cooling furnace through the third opening, arranged on the second spiral supporting plate, and running out of the cooling furnace through the fourth opening, the conveyer belt forming a closed loop;
- a first motor driving the first lower rotating shaft and the second lower rotating shaft;
- a plurality of guiding rollers guiding the conveyer belt; and
- a second motor driving the guiding rollers.

2. The vertical and helical conveyer system of claim 1, wherein the second spiral supporting plate is fixed on an inner wall of the cooling furnace.

3. The vertical and helical conveyer system of claim 1, wherein the heating furnace further includes one or more brackets and the first spiral supporting plate is fixed on the one or more brackets.

4. The vertical and helical conveyer system of claim 1, wherein the heating furnace and the cooling furnace respectively have a gas inlet through which air or a protective gas including at least one of nitrogen, hydrogen, helium, argon, methanol dissociated gas, endothermic protective gas (AX gas), exothermic atmosphere (DX gas) or ammonia dissociated gas are supplied.

5. The vertical and helical conveyer system of claim 1, wherein the first supporting bars are parallel to each other.

6. The vertical and helical conveyer system of claim 5, wherein the second supporting bars are parallel to each other.

7. The vertical and helical conveyer system of claim 1, wherein the heating furnace is provided with a furnace outer shell, a thermal insulation, and a heating element installed inside of the heating furnace.

* * * * *